United States Patent
Walsh (10) Patent No.: US 9,986,437 B2
(45) Date of Patent: May 29, 2018

(54) CODE VERIFICATION FOR WIRELESS DISPLAY CONNECTIVITY

(71) Applicant: Microsoft Technology Licensing, LLC, Redmond, WA (US)

(72) Inventor: Blake Thomas Walsh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 15/269,632

(22) Filed: Sep. 19, 2016

(65) Prior Publication Data

US 2018/0084418 A1 Mar. 22, 2018

(51) Int. Cl.
| | |
|---|---|
| *G09G 5/00* | (2006.01) |
| *H04W 12/06* | (2009.01) |
| *H04W 12/04* | (2009.01) |
| *H04M 1/66* | (2006.01) |
| *G06F 3/00* | (2006.01) |
| *G06F 3/048* | (2013.01) |
| *H04W 84/12* | (2009.01) |

(52) U.S. Cl.
CPC .......... *H04W 12/06* (2013.01); *H04W 12/04* (2013.01); *H04W 84/12* (2013.01)

(58) Field of Classification Search
CPC ........ G09G 2370/16; G09G 2300/023; G09G 2356/00; G09G 2360/04; G09G 2360/06; H04N 9/3147; G06F 3/1423; G06F 3/1454
USPC ........................................................ 345/1.1
See application file for complete search history.

(56) References Cited

U.S. PATENT DOCUMENTS

| | | | |
|---|---|---|---|
| 9,131,147 B2 | 9/2015 | Quarfordt et al. | |
| 2006/0146765 A1 | 7/2006 | Van De Sluis et al. | |
| 2013/0007895 A1 | 1/2013 | Brolley et al. | |
| 2014/0086105 A1 | 3/2014 | Kang et al. | |
| 2014/0315489 A1 | 10/2014 | Lee | |
| 2016/0011999 A1 | 1/2016 | Zhao et al. | |
| 2016/0054971 A1* | 2/2016 | Yu | H04N 7/15 345/2.1 |
| 2016/0381497 A1* | 12/2016 | Wan | H04W 8/005 455/456.2 |

OTHER PUBLICATIONS

"Netgear Support", Published on: Feb. 9, 2013 Available at: http://kb.netgear.com/app/answers/detail/a_id/23796/~/how-to-connect-samsung-galaxy-iii-mobile-phone-and-galaxy-note-to-the-ptv3000.

(Continued)

*Primary Examiner* — Huy C Ho
(74) *Attorney, Agent, or Firm* — Alleman Hall Creasman & Tuttle LLP (57) ABSTRACT

A computing device is provided, which includes a processor configured to, detect a plurality of display devices configured for wireless communication, send a request to the plurality of display devices to cause the plurality of display devices to each display different associated codes, receive user input of one of the codes associated with a target display device of the plurality of display devices, send the one of the codes to the plurality of display devices, receive an identification message from the target display device associated with the one of the codes, establish a display session via a wireless connection with the target display device, and send display content to the target display via the wireless connection.

20 Claims, 6 Drawing Sheets

(56) References Cited

OTHER PUBLICATIONS

"What is Screen mirroring?", Published on: Aug. 22, 2015 Available at: http://www.samsung.com/au/support/skp/faq/1056913.
"To see the PC screen on the TV", Retrieved on: Mar. 12, 2016 Available at: http://kr.eguide.lgappstv.com/manual/wl/dvb/Contents/share/viewpc_e_c_a_t/eng/wl_share_viewpc_e_c_a_t_eng.html.
"Airtame", Published on: Feb. 13, 2016 Available at: http://airtame.com/for-meeting-rooms.
"Mirroring 360", Published on: Sep. 24, 2015 Available at: http://www.mirroring360.com/how-it-works.
"Wireless Display Adapter", Retrieved on: Mar. 12, 2016 Available at: https://www.microsoft.com/accessories/en-us/products/adapters/wireless-display-adapter-2/p3q-00001.

\* cited by examiner

CODE VERIFICATION FOR WIRELESS DISPLAY CONNECTIVITY

BACKGROUND

Display mirroring applications are used to display content from a user's computing device on an external display separate from the user's computing device, for example, via a wireless connection. In this way, a user may share content via the external display with an audience or coworkers, for example. In some facilities, more than one external display may be nearby. In such a case, in some display mirroring applications, nearby wireless display devices are detected and a list of the detected display devices are presented to the user for selection. However, if there are multitude of display devices nearby the user, it can become difficult for the user to determine which particular display device in the list is the specific display device in the user's room.

SUMMARY

To address the above issues, a computing device is provided, which includes a processor configured to detect a plurality of display devices configured for wireless communication, send a request to the plurality of display devices to cause the plurality of display devices to each display different associated codes, receive user input of one of the codes associated with a target display device of the plurality of display devices, send the one of the codes to the plurality of display devices, receive an identification message from the target display device associated with the one of the codes, establish a display session via a wireless connection with the target display device, and send display content to the target display via the wireless connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed in detail below, the inventors have recognized that wirelessly distinguishing between multiple nearby displays to select a specific display for screen mirroring can often be difficult for users, particularly as the number of nearby displays increases. The systems and methods described herein have been devised to address this challenge.

Figure 1:
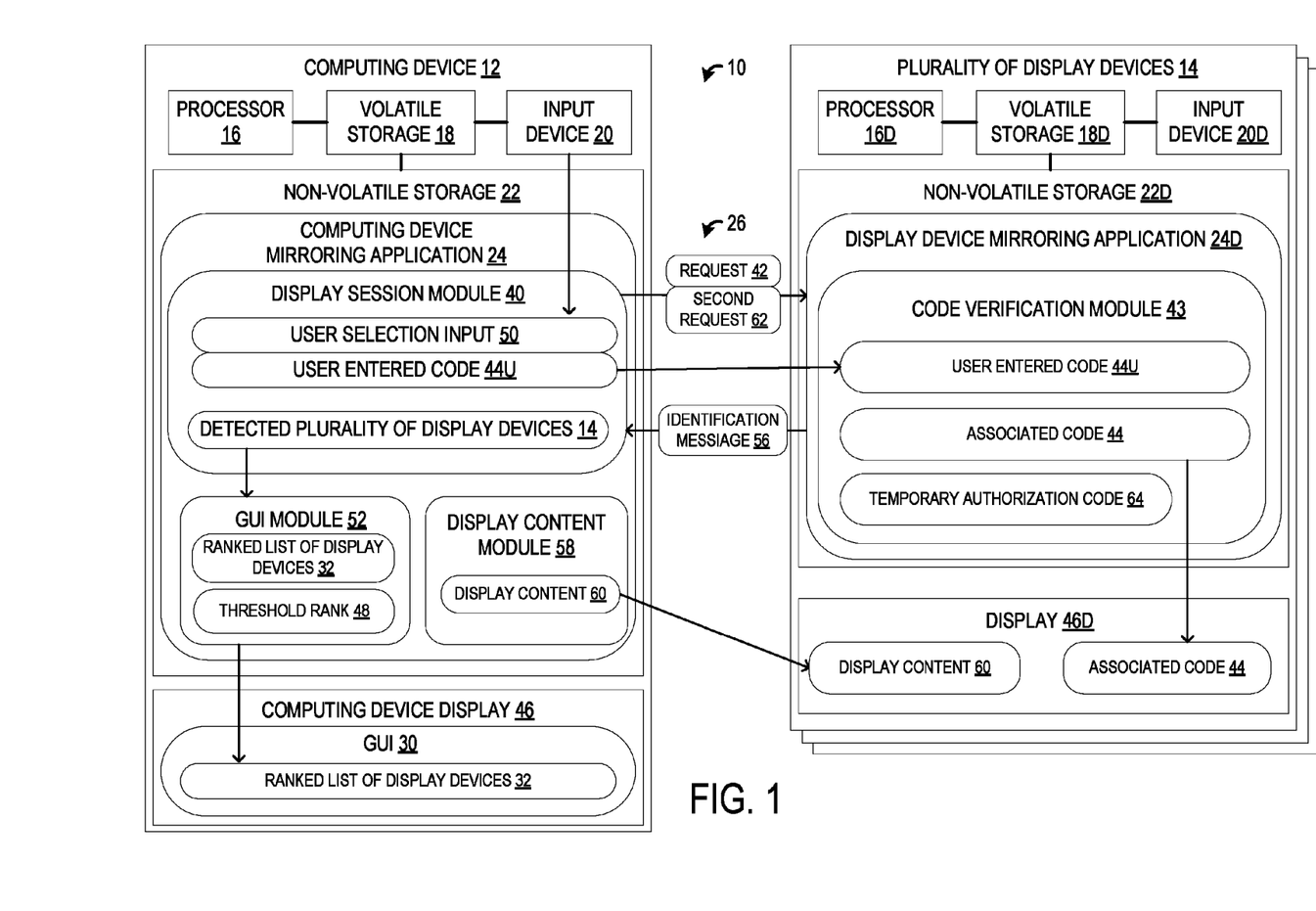
FIG. 1 shows a schematic view of a computing device and a plurality of display devices, according to one embodiment of the present disclosure.

FIG. 1 illustrates a computing systems 10 that includes a computing device 12 and a plurality of display devices 14. The computing device 12 may, for example, take the form of a laptop computing device. In other examples, the computing device 12 may take other suitable forms such as a tablet computing device, a mobile computing device, a desktop computing device, a head mounted display device, a wrist mounted display device, etc. The plurality of display devices 14 may, for example, take the form of a large format display device, a communal meeting display device, or another suitable smart display device.

In the example of FIG. 1, the computing device 12 includes a processor 16, a volatile storage device 18, an input device 20, and a non-volatile storage device 22. The processor 16 is configured to execute a computing device mirroring application 24 stored on the non-volatile storage device 22, and to enact various control processes described herein. In some examples, the processor 16, volatile storage device 18, and non-volatile storage 22 are included in a System-On-Chip configuration.

The plurality of display devices 14 include processors 16D, volatile storage devices 18D, input devices 20D, and non-volatile storage devices 22D. The processor 16D of the plurality of display devices 14 are each configured to execute a display device mirroring application 24D, and to enact various control processes described herein. In some examples, the processors 16D, volatile storage devices 18D, input devices 20D, and non-volatile storage 22 are included in System-On-Chip configurations.

As shown in the example of FIG. 1, the computing device mirroring application 24 executed by the computing device 12 is configured to communicate with the display device mirroring applications 24D executed by the processors 16D of the plurality of display devices 14 over a communication network 26. The communication network 26 may, for example, be a wireless network that takes the form of a WI-FI network. However, it will be appreciated that the communication network 26 may take other suitable forms, including other types of wireless networks such as Bluetooth, etc.

In one embodiment, the computing device mirroring application 24 executed by the processor 16 of the computing device 12 is configured to detect a plurality of display devices 14 configured for wireless communication, such as Wi-Fi communication. In one example, the computing device 12 is configured to scan for all nearby display devices that are configured for compatible wireless communication. It will be appreciated that the computing device mirroring application 24 executed by the processor 16 may detect one or more of the plurality of display devices 14 depending upon the surrounding environment and the specific configuration of computing system 10.

Figure 2:
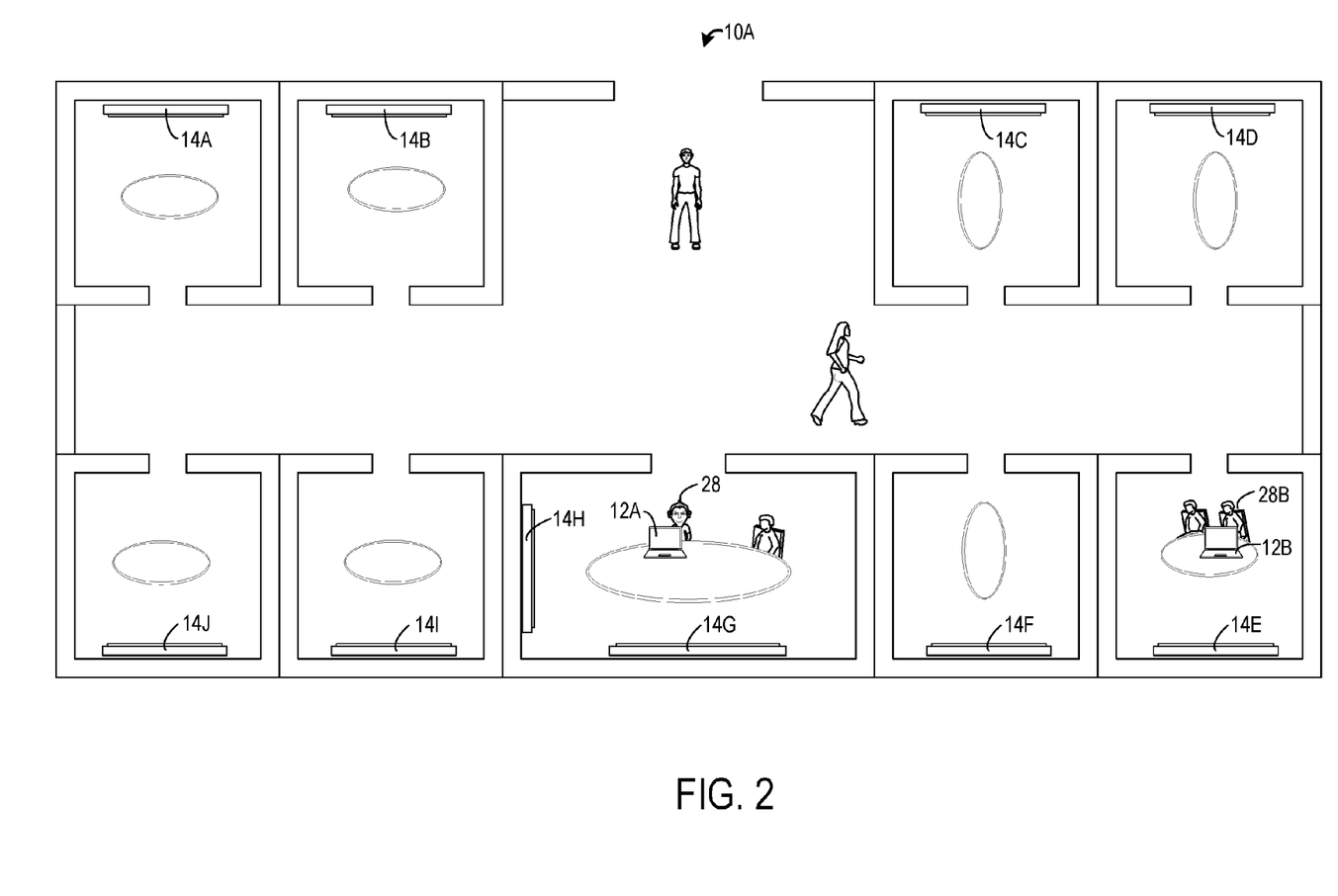
FIG. 2 shows and overhead view of an example scenario of a plurality of display devices nearby by the computing device of FIG. 1.

FIG. 2 illustrates an example computing system 10A. In the illustrated example, a user 28 intends to initiate a display mirroring session between the user's 28 computing device 12A and one of the display devices 14H or 14G located in the conference room that the user 28 is located in. Accordingly, the computing device mirroring application 24 executed on the user's 28 computing device 12A is configured to detect nearby display devices configured for wireless connectivity. In this manner, computing device 12 detects the display devices 14H and 14G located in the conference room. However, in the illustrated example, there are a plurality of nearby display devices 14A-14J that the computing device 12A is able to detect while scanning for nearby display devices configured for wireless connectivity. Thus, in order to distinguish the user's 28 intended display devices 14H or 14G from the plurality of detected display devices 14A-14J, the computing device mirroring application 24 executed on the user's 28 computing device 12A presents the detected displayed devices to the user 28 for selection.

Figure 3:
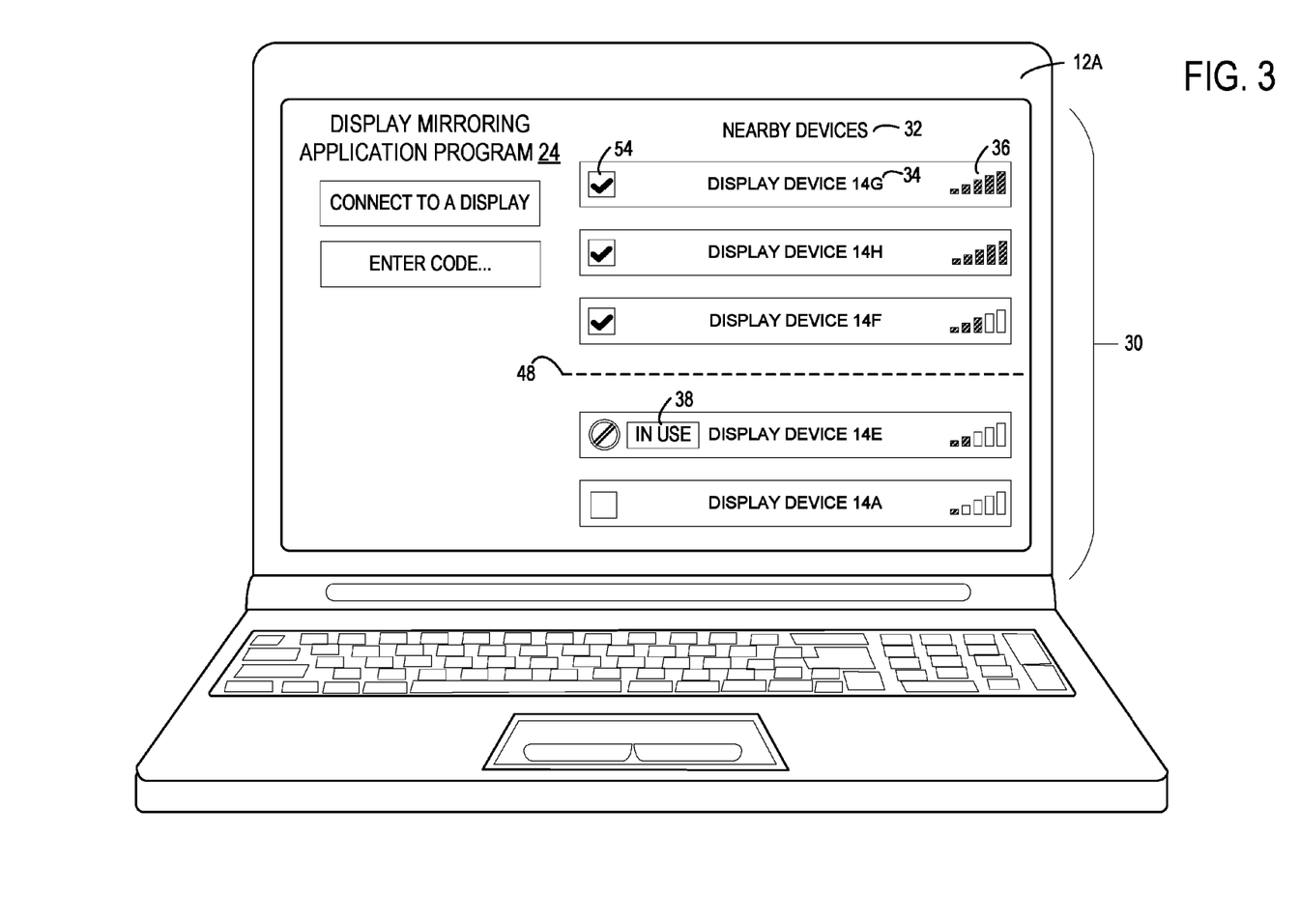
FIG. 3 shows an example graphical user interface including a list of the nearby plurality of display devices of FIG. 1.

Now turning to FIG. 3, an example graphical user interface 30 for the computing device mirroring application 24 is illustrated. As shown, the detected plurality of display devices 14 are presented to the user 28 in a list 32. For example, the detected plurality of display device 14A-14J of FIG. 2 may be presented to the user 28 in a list on the computing device 12A of the user 28. In the embodiment illustrated in FIG. 3, the list 32 includes a designation name 34 for each of the plurality of display devices 14 detected by the computing device 12A of the user 28. In one example, the computing device mirroring application 24 executed on the computing device 12 may be configured to generate generic designation names 34 for each of the detected nearby display devices. In another example, the computing device mirroring application 24 may be configured to request and receive a designation name 34 from each of the detected nearby display devices. In the latter example, each display device of the plurality of display devices 14 may include a setting for that display device's designation name 34.

Further in the illustrated example of FIG. 3, the list 32 of the plurality of display devices 14 is a ranked list. In one example of the ranked list, the plurality of display devices 14 are ranked based on proximity to the computing device 12. Accordingly, in the example computing system 10A and surrounding environment of FIG. 2, the display devices 14H and 14G are the most proximate display devices relative to the user's 28 computing device 12A, and would thus be presented at a higher rank in the ranked list compared to the more distant display devices 14E and 14F. The proximity of each of the display devices 14 may be detected based on a Wi-Fi signal strength 36 detected by the computing device 12 for each display device 14. However, it will be appreciated that the proximity of each of the display devices 14 may be detected via other methods, such as, for example, a geographical positioning system (GPS) enabled for each display device, an indoor positioning system, or other suitable positioning system methods.

In the example illustrated in FIG. 2, the various walls of the building of the environment surrounding the user's 28 computing device 12A may decrease the Wi-Fi signal strength of each display device that is not located in the same room as the user's 28 computing device 12A. Thus, display devices 14H and 14G will have a higher detected Wi-Fi signal strength compared to display devices 14A, 14B, 14C, 14D, 14E, 14F, 141, and 14J. Thus, as shown in FIG. 3, the most proximate display devices 14G and 14H are ranked higher in the ranked list than the more distance display devices 14F, 14E, and 14A, relative to the user's 28 computing device 12A.

As further illustrated in FIG. 2, some of the display devices of the example plurality of display devices 14A-14J may currently be in use by another user 28A. In the illustrated example, the display device 14E currently has already established a display mirroring session with the other user's 28B computing devices 12B. Thus, the user's 28 computing device 12A may be configured to prevent establishment of a display mirroring session with the currently occupied display device 14E.

Turning back to FIG. 3, the graphical user interface 30 of the computing device mirroring application 24 may indicate whether any of the nearby detected display devices are already currently in use by other users. In the illustrated example, the list 32 further includes a visual tag 38 that indicates that a display device 14E of the plurality of display devices 14 currently has an established display session with another computing device 12B. As shown, the visual tag 38 includes a the phrase "IN USE" to clearly indicate that the specific display device 14E is already occupied by another user, and is thus not available for establishing new display mirroring session. It will be appreciated that the visual tag 38 may take other suitable forms, such as, for example, a symbol, a highlight, a change in color, etc.

In one example, if the user already knows the specific designation name for the display device that the user intends to use for display mirroring, the user may select the specific display device from the list 32 and establish the display mirroring session. However, in some examples, the user may not know the specific designation name for the intended display device. Thus, the computing device mirroring application 24 executed by processor 16 of computing device 12 may be configured to a code verification method to distinguish between the plurality of display devices 14.

Turning back to FIG. 1, a display session module 40 of the computing device mirroring application 24 is configured to send a request 42 to the plurality of display devices 14 to cause the plurality of display devices 14 to each display different associated codes 44. The request 42 may be received by a code verification module 43 of the display device mirroring application 24D executed by each of the plurality of display devices 14. In response to receiving the request 42, each of the plurality of display devices 14 is configured to display an associated code 44 on each associated display 46D for that display device. In one example, each display device of the plurality of display devices 14 is configured to generate an associated code 44 upon receiving the request 42. The associated code 44 may be generated via a pseudo random method, such as, for example, a code generated based off of a current time stamp and a serial number for that display device. In this manner, each display device of the plurality of display devices 14 generates different associated codes without any overlap between the associated codes. It will be appreciated that other suitable methods may be used to randomly or pseudo randomly generate the associated codes 44. In another example, the associated code 44 for each display device of the plurality of display devices 14 may be preset by a manufacturer or administrator. For example, the associated code 44 may be preset and stored on the non-volatile storage 22D of each display device. In one example, before displaying its associated code, each code of the different associated codes 44 is known only to an associated display device of the plurality of display devices 14. That is, each display device of the plurality of display devices 14 stores its own associated code 44 that is only revealed in response to the request 42 from the computing device 12. Thus, the computing device 12 does not know the associated code 44 for a display device intended for display mirroring until entered by the user 28.

Figure 4:
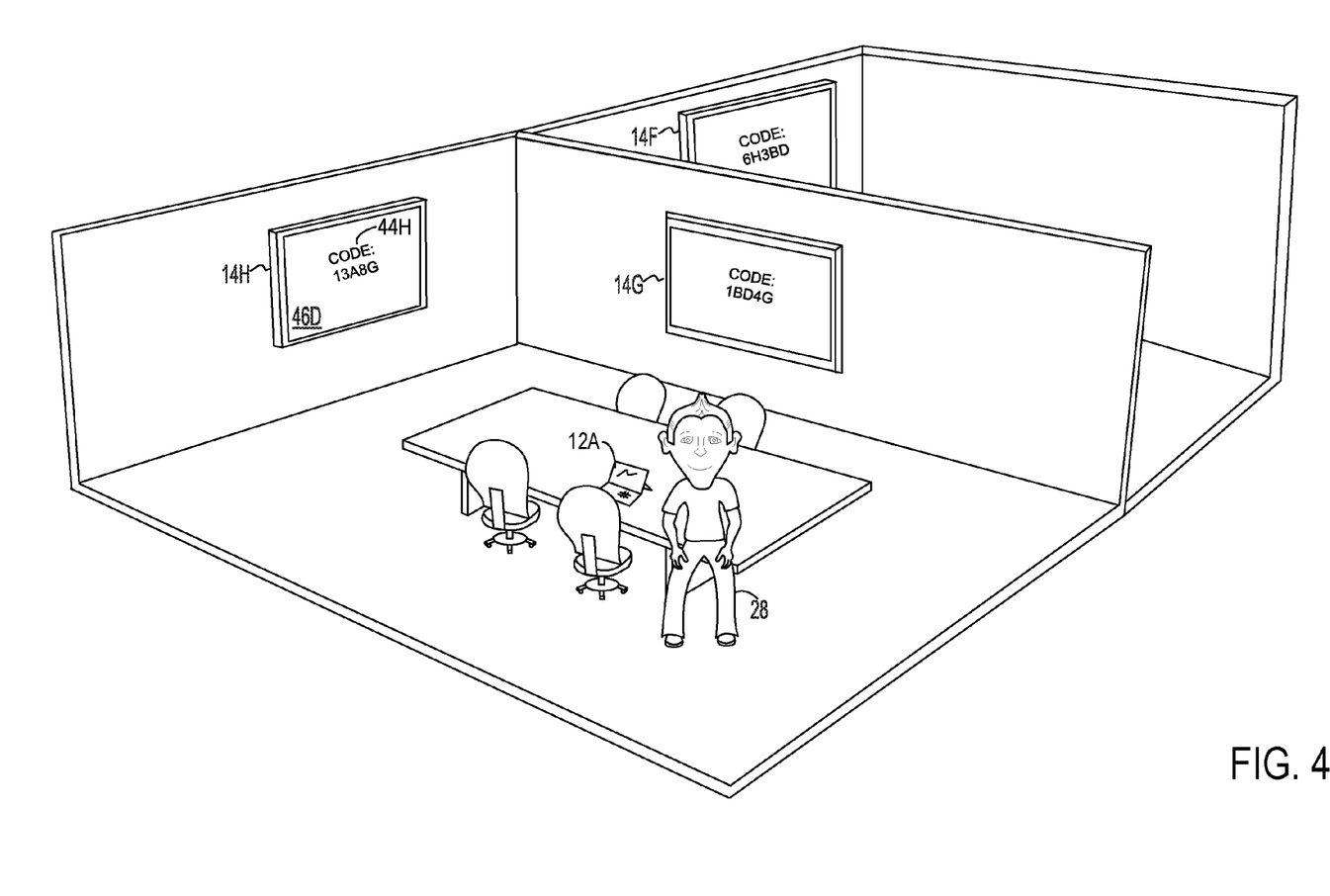
FIG. 4 shows a plurality of codes displayed on the plurality of display devices of FIG. 1.

Based on at least receiving the request 42, each display device of the plurality of display devices 14 is configured to display its associated code 44 of its display 46D. Turning to FIG. 4, an example of various different associated codes 44 displayed by each of a plurality of display devices is shown. In the illustrated example, the display devices 14H and 14G are located in the same room as the user 28, while display device 14F is located in a different room. As discussed above, the user's 28 computing device 12A sends a request 42 to the plurality of display devices 14 detected by the user's 28 computing device 12A. Based on at least receiving the request 42, each of the plurality of display devices 14, including display devices 14H, 14G, and 14F are configured to display their associated codes 44.

In one example, to send the request 42 to the plurality of display devices 14 to cause the plurality of display devices 14 to each display different associated codes 44, the processor 16 is further configured to send the request 42 to one or more display devices above a threshold rank 48 in the ranked list of the plurality of display devices. Briefly turning back to FIG. 3, the ranked list 32 presented by the user's 28 computing device 12A has detected display devices 14G, 14H, 14F, 14E, and 14A, and ranked them by detected Wi-Fi signal strengths 36. In this example, the ranked list 32 includes a threshold rank 48 for the detected Wi-Fi signal strengths 36 of each of the detected display devices in the ranked list 32. Thus, in this example, when sending the request 42, the 28 computing device 12A of the user 28 is configured to send the request 42 to only the display devices in the ranked list 32 above the threshold ranked 48. Accordingly, the computing device 12A of the user 28 sends the request 42 to display devices 14G, 14H, and 14F. In one example, the threshold rank 48 may be a threshold number of display devices, such as, for example, the top three display devices in the ranked list 32 of display devices. However, it will be appreciated that any other suitable form of thresholding may be utilized to select display devices in the ranked list 32.

In another example, to send the request 42 to the plurality of display devices 14 to cause the plurality of display devices 14 to each display different associated codes 44, the processor 16 is further configured to receive a user selection input 50 of one or more display devices of the plurality of display devices 14 in the ranked list 32. In this example, a GUI module 52 of the computing device mirroring application 24 is configured to present the detected plurality of display devices 14 in a ranked list of display devices 32 on a computing device display 46 of the computing device 12. Turning to FIG. 3, the example GUI 30 includes the ranked list of display devices 32, and further includes check boxes 54 that the user 28 may interact with via the GUI to enter the user selection input 50 of one or more display devices of the plurality of display devices 14. In this example, the input device 20 may be a mouse or a capacitive touch screen, and the user 28 may enter the user selection input 50 by clicking or pressing the check box 54 of the example GUI 30 for each suitable display device.

In this specific example, the user 28 has selected each display device that has a detected Wi-Fi signal strength 36 above the threshold rank 48, as these display devices 14G, 14H, and 14F are the mostly likely candidates for being the display devices in the same room as the user 28. It will be appreciated that the user selection input 50 and input devices 20 may take other suitable forms. For example, the input device 20 may be a microphone, and the user selection input 50 may the user speaking the designation name 34 for the selected display devices shown in the ranked list 32. It will be appreciated that the above examples of user selection inputs are merely illustrative, and other types of inputs and input devices not specifically mentioned above may also be utilized to select desired display devices.

Based on at least receiving the user selection input 50 of one or more display devices of the plurality of display devices 14 in the ranked list 32, the computing device mirroring application 24 is further configured to send the request 42 to the selected one or more display devices. Thus, in these examples, the request 42 is not sent to a subset of display devices of the plurality of display devices 14 that are either not selected via the user selection input 50 or were below the threshold rank 48 in the ranked list 32 of detected display devices.

As discussed previously, each display device of the plurality of display devices 14 that receives the request 42 is configured to display its associated code 44 on its display 46D. Turning to FIG. 4, an example of display devices displaying associated codes 44 is illustrated. As shown, the user's 28 computing device 12A has sent the request 42 to display devices 14H, 14G, and 14F of the plurality of display devices 14, to cause display devices 14H, 14G, and 14F to show their associated codes. It will be appreciated that at this point in time, each associated code is known only to its associated display device. Thus, the computing device 12A of the user 28 does not know what the associated code 44 is for any of the display devices. However, as each display device is configured to display its associated code 44 in response to the request 42, the user 28 may view the associated codes of any display device located in the same room as the user, or otherwise in a viewable location for the user 28.

In the example illustrated in FIG. 4, the user 28 intends to initiate a display mirroring session between the user's computing device 12A and a target display 14H of the plurality of display devices 14. Thus, after the request 42 is sent, and the target display 14H displays its associated code 44H, the user 28 may view the display 46D of the target display device 14H, and determine the associated code 44H. In this manner, the user 28 may enter the associated code 44H, having the value of "13A8G", for the target display device 14H to the user's computing device 12A via the input device 20.

In one example, the input device is a keyboard, and the user 28 types in the associated code "13A8G" for the target display device 14H. However, it will be appreciated that other suitable methods may be utilized, such as speaking the associated code into a microphone input device. Additionally, although the example associated code is illustrated as a five character string of numbers and letters, it will be appreciated that any suitable type of code may be utilized. For example, the associated codes 44 may include any number of characters, non-alphabetical characters, etc.

It will be appreciated that while the display device 14F is displaying its own associated code, because the display device 14F is located in a different room relative to the user 28, the user 28 cannot see that code associated with display device 14F and thus does not know the value of that code. Accordingly, the user 28 cannot input that code into the computing device 12A of the user 28. In this manner, the user 28 is prevented from establishing a display mirroring session with the display device 14F.

Turning back to FIG. 1, the computing device 12 is configured to receive user input of one of the codes 44U associated with a target display device 14H of the plurality of display devices 14. Based on at least receiving user input of one of the codes 44U, the display session module 40 of the computing device mirroring application 24 is further configured to send the one of the codes 44U to the plurality of display devices 14. In one example, the display session module 40 is configured to send the one of the codes 44U to the same set of display devices to which the request 42 was sent. It will be appreciated that at this point in time, computing device 12 does not know which particular display device of the plurality of display devices 14 is associated with the one of the codes 44U.

As illustrated, each of the plurality of display devices 14 receives the one of the codes 44U sent by the computing device 12. The code verification module 43 of the display device mirroring application 24D executed by each of the plurality of display devices 14 checks the received one of the codes 44U against its associated code 44. Next, the particular display device of the plurality of display devices 14 that has an associated code 44 that matches the user entered code 44H is configured to send an identification message 56 to the computing device 12. The identification message 56 may include a network address, or other identification information to allow the computing device 12 to establish a connection with that particular display device via Wi-Fi.

As shown, the computing device 12 is configured to receive the identification message 56 from the target display device associated with the one of the codes 44U. In the example illustrated in FIG. 4, the target display device is display device 14H. Thus, the user 28 entered the code "13A8G" into the user's 28 computing device 12A, which was sent to display devices 14H, 14G, and 14F of the plurality of display devices 14. Next, each display device checked the user entered code against their own associated codes 44. In this manner, only the target display device 14H had a matching associated code 44, and thus only the target display device 14H sends an identification message 56 to the user's 28 computing device 12A.

Turning back to FIG. 1, based on at least receiving the identification message 56, the computing device 12 is configured to establish a display session via a Wi-Fi connection with the target display device. After establishing the display session with the target display device, a display content module 58 of the computing device mirroring application 24 executed on computing device 12 is configured to send display content 60 to the target display via the Wi-Fi connection. In this manner, the target display of the plurality of displays 14 may present the display content 60 on its display 46D.

In one embodiment, the user 28 may desire to prevent the target display from establishing new display sessions with other users for a period of time. Thus, as illustrated in FIG. 1, the computing device mirroring application 24 may be configured to send a second request 62 to the target display device to cause the target display device to generate a temporary authorization code 64 such that only computing devices that send the temporary authorization code 64 to the target display device are authorized to establish a display session with the target display device. The temporary authorization code 64 may be generated by the code verification module 43 of the display device mirroring application 24D of the target display device. In one example, the temporary authorization code 64 is set for a specific period of time, such as, for example, one hour. In this manner, upon attempting to establish a display session with the target display device, any computing devices 12 may be prompted to enter the temporary authorization code 64. If the entered code does not match the target display device's temporary authorization code 64, the target display device may prevent establishment of the display session. Accordingly, the user 28 may hand out the temporary authorization code 64 to specific users in order to manage which users may establish a display session with the target display device and display content.

Figure 5:
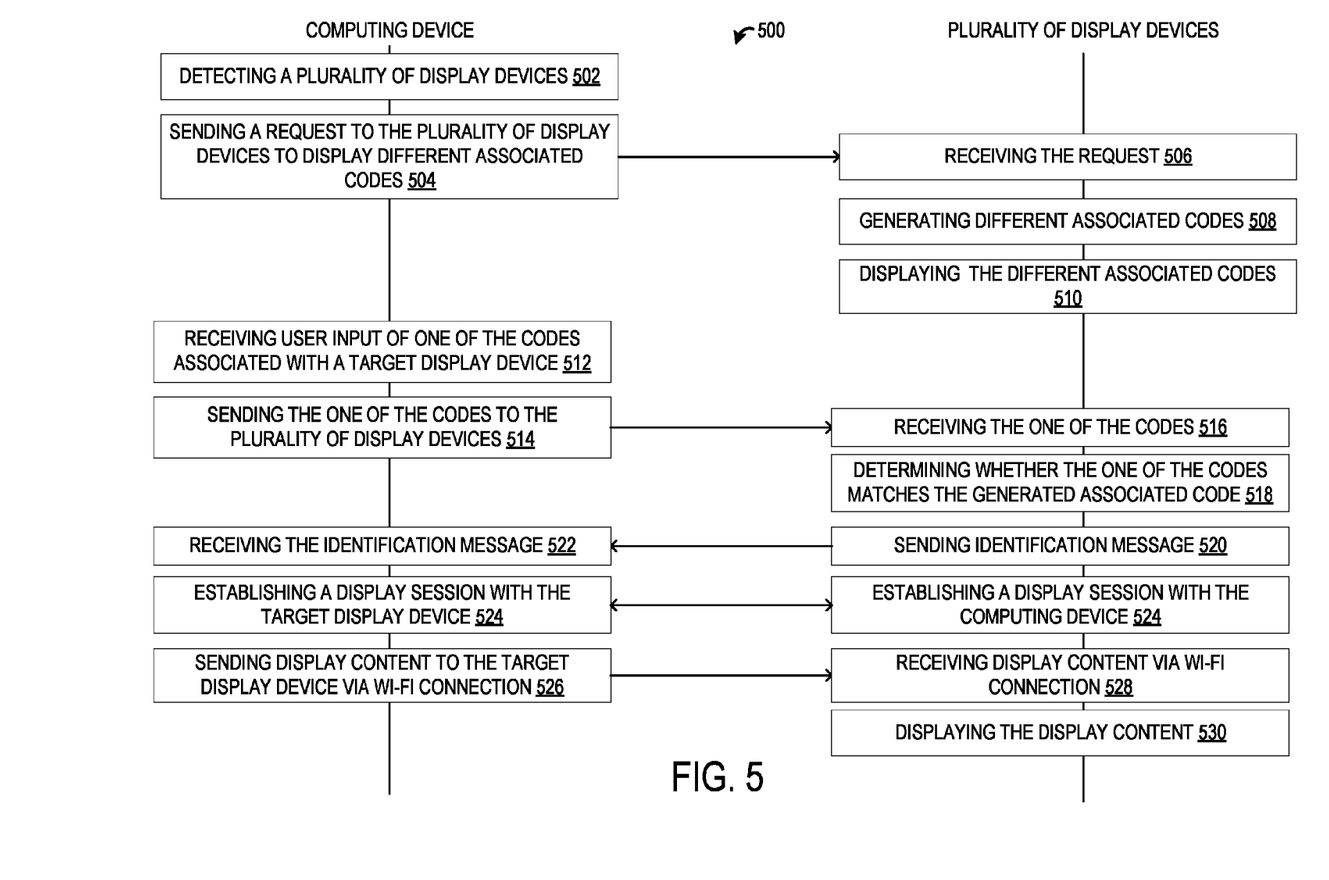
FIG. 5 shows an example method for code verification for WI-FI display connectivity.

FIG. 5 shows an example computer-implemented method 500 according to an embodiment of the present disclosure. At step 502, the method 500 may include, detecting a plurality of display devices configured for wireless communication, such as Wi-Fi communication. For example, the computing device 12 may be configured to scan through all detectable wireless connections for display devices configured for Wi-Fi communication.

Advancing from step 502 to step 504, the method 500 may include sending a request to the plurality of display devices to cause the plurality of display devices to each display different associated codes. In one example, the request is sent to all of the detected display devices. In another example, the request is only sent to a subset of the detected display devices. For example, the detected plurality of display devices may be presented to the user in a list that includes a designation name for each of the plurality of display devices. It will be appreciated that the designation names may be randomly generated for each display device, or may be preset for each display device by a manufacturer or a network administrator. The list may further include a visual tag that indicates that a display device of the plurality of display devices currently has an established display session with another computing device. The visual tag may, for example, be a symbol or icon that indicates to a user that a particular display device is already in use.

In some examples, the list of the plurality of display devices is a ranked list. It will be appreciated that the plurality of display devices may be ranked according to many suitable ranking criterions. In one example, the plurality of display devices may be ranked based on a Wi-Fi signal strength for each display device. In another example, the plurality of display devices are ranked based on a physical proximity to the user's computing device. In ranked list examples, sending the request to the plurality of display devices to cause the plurality of display devices to each display different associated codes, further comprises sending the request to one or more display devices above a threshold rank in the ranked list of the plurality of display devices. The threshold rank may, for example, be the top three display devices in the ranked list or any other threshold rank, such as the top two or four display devices in the ranked list. In another example, the threshold rank may be a threshold Wi-Fi signal strength or a threshold physical proximity.

In another ranked list example, sending the request to the plurality of display devices to cause the plurality of display devices to each display different associated codes, further comprises receiving a user selection input of one or more display devices of the plurality of display devices in the ranked list, and sending the request to the selected one or more display devices. The user selection input may, for example, be a mouse click or a touch input to a GUI element, such as a check box, to select one or more of the display devices in the ranked list. However, it will be appreciated that the user selection input may take other forms depending on the input device, such as a spoken input into a microphone of a designation name for the selected display device in the ranked list.

After sending the request, the method 500 proceeds from step 504 to step 506 and may include receiving the request at each of the plurality of display devices. At the plurality of display devices, the method 500 advances from step 506 to step 508 and may include generating different associated codes. In one example, each code of the different associated codes is known only to an associated display device of the plurality of display devices. For example, upon receiving the request, each display device may be configured to pseudo randomly generate a code based on, for example, a serial number and a current time stamp. However, it will be appreciated that the code may be generated though any suitable means. Advancing from step 508 to step 510, the method 500 may include displaying the different associated codes on each of the plurality of display devices. In one example, each display device presents its own associated code on its display, which is then viewable by a user of the computing device. By viewing the different associated codes, the user may determine which code of the different associated codes is being displayed by a target display device that the user intends to display content on.

Proceeding from step 510 to step 512, the method 500 may include receiving user input of one of the codes associated with a target display device of the plurality of display devices. It will be appreciated that the user is only able to see, and thus only able to know and enter codes associated with a display device that is in a viewable location relative to the user. Accordingly, the user is prevented from entering a code associated with a display device that is in another room or otherwise not viewable by the user.

Advancing from step 512 to step 514, the method 500 may include sending the one of the codes to the plurality of display devices. At the plurality of display devices, the method 500 proceeds from step 514 to step 516 and may include receiving the one of the codes. Proceeding from step 516 to step 518, the method may include, at each of the display devices, comparing the one of the codes to the associated code of that display device and determining whether the one of the codes matches the generated associated code. If one of the display devices determines that the one of the codes matches its associated code, the method 500 advances from step 518 to step 520 and may include, at that display device, sending an identification message to the computing device. In one example, the identification message includes a network address, or other suitable data to facilitate identification of that display device with the computing device.

Proceeding from step 520 to step 522, the method 500 may include, at the computing device, receiving the identification message from the target display device associated with the one of the codes. After receiving the identification message, the method 500 advances from step 522 to step 524 and may include establishing a display session based on the identification message via a wireless connection, such as a Wi-Fi connection with the target display device. It will be appreciated that step 524 may be processed by both the computing device and the target display device of the plurality of display devices together. For example, an authorization handshake process may be utilized in back and forth communication between the computing device and the target display device.

Advancing from step 524 to step 526, the method 500 may include, at the computing device, sending display content to the target display device via the wireless (e.g., Wi-Fi) connection. The display content may be a slide presentation, a video, a stream of data for screen mirroring, or any other suitable type of content to be displayed. Thus, depending on the content, step 526 may include sending display content to the target display device in a stream of display content. Proceeding from step 526 to step 528, the method 500 may include, at the target display device, receiving the display content. Similarly, step 528 may include receiving a stream of display content over a period of time. Advancing from step 528 to step 530, the method 500 may include displaying the display content.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
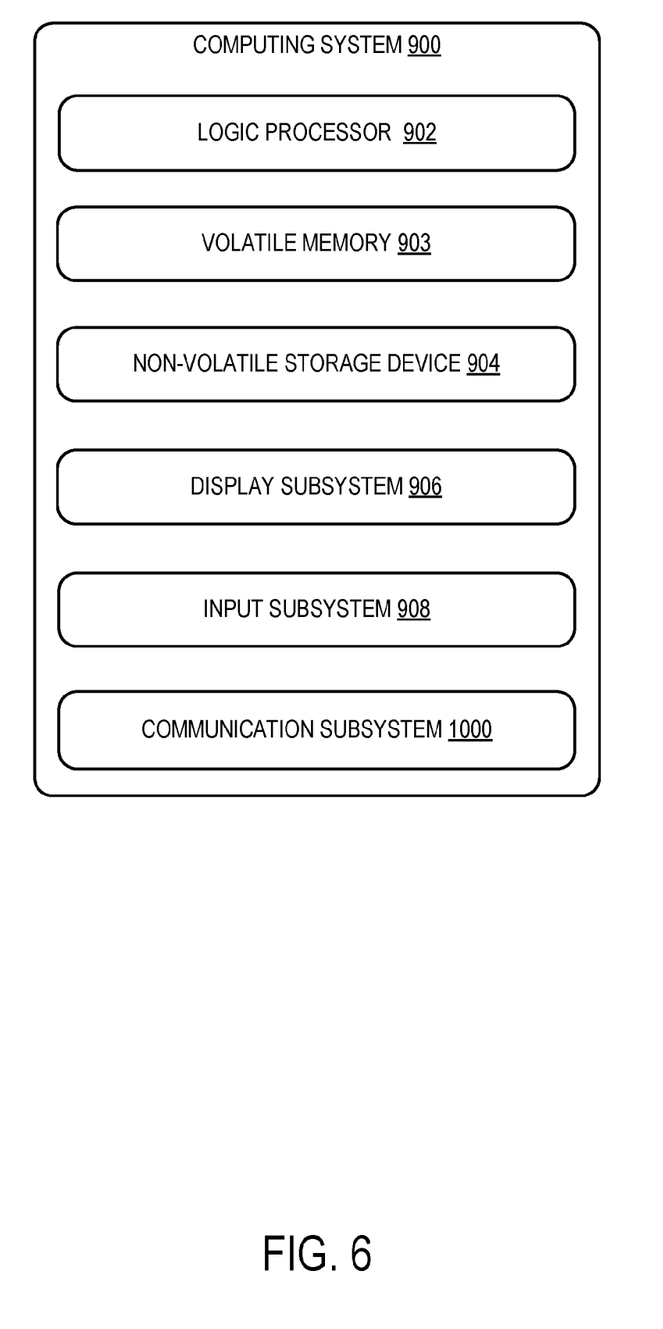
FIG. 6 shows an example computing system according to an embodiment of the present disclosure.

FIG. 6 schematically shows a non-limiting embodiment of a computing system 900 that can enact one or more of the methods and processes described above. Computing system 900 is shown in simplified form. Computing system 900 may embody the computing device 12 or one or more of the plurality of display devices 14 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computing device comprising, a processor configured to, detect a plurality of display devices configured for wireless communication, send a request to the plurality of display devices to cause the plurality of display devices to each display different associated codes, receive user input of one of the codes associated with a target display device of the plurality of display devices, send the one of the codes to the plurality of display devices, receive an identification message from the target display device associated with the one of the codes, establish a display session based on the identification message via a wireless connection with the target display device, and send display content to the target display device via the wireless connection. In this aspect, additionally or alternatively, each code of the different associated codes may be known only to an associated display device of the plurality of display devices. In this aspect, additionally or alternatively, the detected plurality of display devices may be presented to the user in a list that may include a designation name for each of the plurality of display devices. In this aspect, additionally or alternatively, the list may further include a visual tag that indicates that a display device of the plurality of display devices currently has an established display session with another computing device. In this aspect, additionally or alternatively, the list of the plurality of display devices may be ranked list. In this aspect, additionally or alternatively, the wireless connection may be a Wi-Fi connection and the plurality of display devices may be ranked based on a Wi-Fi signal strength detected by the computing device for each display device. In this aspect, additionally or alternatively, the plurality of display devices may be ranked based on a physical proximity to the computing device. In this aspect, additionally or alternatively, to send the request to the plurality of display devices to cause the plurality of display devices to each display different associated codes, the processor may be further configured to send the request to one or more display devices above a threshold rank in the ranked list of the plurality of display devices. In this aspect, additionally or alternatively, to send the request to the plurality of display devices to cause the plurality of display devices to each display different associated codes, the processor may be further configured to, receive a user selection input of one or more display devices of the plurality of display devices in the ranked list, and send the request to the selected one or more display devices. In this aspect, additionally or alternatively, the processor may be further configured to send a second request to the target display device to cause the target display device to generate a temporary authorization code such that only computing devices that send the temporary authorization code to the target display device are authorized to establish a display session with the target display device.

Another aspect provides a method comprising detecting a plurality of display devices configured for wireless communication, sending a request to the plurality of display devices to cause the plurality of display devices to each display different associated codes, receiving user input of one of the codes associated with a target display device of the plurality of display devices, sending the one of the codes to the plurality of display devices, receiving an identification message from the target display device associated with the one of the codes, establishing a display session based on the identification message via a wireless connection with the target display device, and sending display content to the target display device via the wireless connection. In this aspect, additionally or alternatively, each code of the different associated codes may be known only to an associated display device of the plurality of display devices. In this aspect, additionally or alternatively, the detected plurality of display devices may be presented to the user in a list that includes a designation name for each of the plurality of display devices. In this aspect, additionally or alternatively, the list may further include a visual tag that indicates that a display device of the plurality of display devices currently has an established display session with another computing device. In this aspect, additionally or alternatively, the list of the plurality of display devices may be a ranked list. In this aspect, additionally or alternatively, the wireless connection may be a Wi-Fi connection and the plurality of display devices may be ranked based on a Wi-Fi signal strength for each display device. In this aspect, additionally or alternatively, the plurality of display devices may be ranked based on a physical proximity. In this aspect, additionally or alternatively, sending the request to the plurality of display devices to cause the plurality of display devices to each display different associated codes, may further comprise sending the request to one or more display devices above a threshold rank in the ranked list of the plurality of display devices. In this aspect, additionally or alternatively, sending the request to the plurality of display devices to cause the plurality of display devices to each display different associated codes, may further comprises receiving a user selection input of one or more display devices of the plurality of display devices in the ranked list, and sending the request to the selected one or more display devices.

Another aspect provides a computing device comprising a processor configured to, detect a plurality of display devices configured for Wi-Fi communication, rank the plurality of display devices based on a Wi-Fi signal strength, send a request to one or more of the plurality of display devices above a threshold rank to cause the one or more display devices to each display different associated codes, receive user input of one of the codes associated with a target display device of the one or more display devices, send the one of the codes to the one or more display devices, receive an identification message from the target display device associated with the one of the codes, establish a display session based on the identification message via a Wi-Fi connection with the target display device, and send display content to the target display device via the Wi-Fi connection.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising:
 a processor configured to:
  detect a plurality of display devices configured for wireless communication;
  send a request to the plurality of display devices to cause the plurality of display devices to each display different associated codes;
  receive user input of one of the codes associated with a target display device of the plurality of display devices;
  send the one of the codes to each display device of the plurality of display devices;
  receive an identification message from the target display device associated with the one of the codes;
  establish a display session based on the identification message via a wireless connection with the target display device; and
  send display content to the target display device via the wireless connection.

2. The computing device of claim 1, wherein each code of the different associated codes is known only to an associated display device of the plurality of display devices.

3. The computing device of claim 1, wherein the detected plurality of display devices are presented to the user in a list that includes a designation name for each of the plurality of display devices.

4. The computing device of claim 3, wherein the list further includes a visual tag that indicates that a display device of the plurality of display devices currently has an established display session with another computing device.

5. The computing device of claim 3, wherein the list of the plurality of display devices is a ranked list.

6. The computing device of claim 5, wherein the wireless connection is a Wi-Fi connection and the plurality of display devices are ranked based on a Wi-Fi signal strength detected by the computing device for each display device.

7. The computing device of claim 5, wherein the plurality of display devices are ranked based on a physical proximity to the computing device.

8. The computing device of claim 5, wherein to send the request to the plurality of display devices to cause the plurality of display devices to each display different associated codes, the processor is further configured to send the request to one or more display devices above a threshold rank in the ranked list of the plurality of display devices.

9. The computing device of claim 5, wherein to send the request to the plurality of display devices to cause the plurality of display devices to each display different associated codes, the processor is further configured to:
 receive a user selection input of one or more display devices of the plurality of display devices in the ranked list; and
 send the request to the selected one or more display devices.

10. The computing device of claim 1, wherein the processor is further configured to:
 send a second request to the target display device to cause the target display device to generate a temporary authorization code such that only computing devices that send the temporary authorization code to the target display device are authorized to establish a display session with the target display device.

11. A method comprising:
- detecting a plurality of display devices configured for wireless communication;
- sending a request to the plurality of display devices to cause the plurality of display devices to each display different associated codes;
- receiving user input of one of the codes associated with a target display device of the plurality of display devices;
- sending the one of the codes to each display device of the plurality of display devices;
- receiving an identification message from the target display device associated with the one of the codes;
- establishing a display session based on the identification message via a wireless connection with the target display device; and
- sending display content to the target display device via the wireless connection.

12. The method of claim 11, wherein each code of the different associated codes is known only to an associated display device of the plurality of display devices.

13. The method of claim 11, wherein the detected plurality of display devices are presented to the user in a list that includes a designation name for each of the plurality of display devices.

14. The method of claim 13, wherein the list further includes a visual tag that indicates that a display device of the plurality of display devices currently has an established display session with another computing device.

15. The method of claim 13, wherein the list of the plurality of display devices is a ranked list.

16. The method of claim 15, wherein the wireless connection is a Wi-Fi connection and the plurality of display devices are ranked based on a Wi-Fi signal strength for each display device.

17. The method of claim 15, wherein the plurality of display devices are ranked based on a physical proximity.

18. The method of claim 15, wherein sending the request to the plurality of display devices to cause the plurality of display devices to each display different associated codes, further comprises sending the request to one or more display devices above a threshold rank in the ranked list of the plurality of display devices.

19. The method of claim 15, wherein sending the request to the plurality of display devices to cause the plurality of display devices to each display different associated codes, further comprises:
- receiving a user selection input of one or more display devices of the plurality of display devices in the ranked list; and
- sending the request to the selected one or more display devices.

20. A computing device comprising:
- a processor configured to:
  - detect a plurality of display devices configured for Wi-Fi communication;
  - rank the plurality of display devices based on a Wi-Fi signal strength;
  - send a request to one or more of the plurality of display devices above a threshold rank to cause the one or more display devices to each display different associated codes;
  - receive user input of one of the codes associated with a target display device of the one or more display devices;
  - send the one of the codes to each display device of the one or more display devices;
  - receive an identification message from the target display device associated with the one of the codes;
  - establish a display session based on the identification message via a Wi-Fi connection with the target display device; and
  - send display content to the target display device via the Wi-Fi connection.

* * * * *